US011122243B2

(12) United States Patent
Emig et al.

(10) Patent No.: US 11,122,243 B2
(45) Date of Patent: Sep. 14, 2021

(54) METHOD AND APPARATUS FOR REMAPPING PIXEL LOCATIONS

(71) Applicant: FlightSafety International, Flushing, NY (US)

(72) Inventors: David Michael Emig, St. Louis, MO (US); Brock Allen Ebert, Wentzville, MO (US); Terry Richard Linn, St. Louis, MO (US)

(73) Assignee: FLIGHTSAFETY INTERNATIONAL INC., Melville, NY (US)

( * ) Notice: Subject to any disclaimer, the term of this patent is extended or adjusted under 35 U.S.C. 154(b) by 0 days.

(21) Appl. No.: 16/688,795

(22) Filed: Nov. 19, 2019

(65) Prior Publication Data

US 2020/0177850 A1    Jun. 4, 2020

Related U.S. Application Data

(60) Provisional application No. 62/769,368, filed on Nov. 19, 2018.

(51) Int. Cl.
*H04N 9/31*    (2006.01)

(52) U.S. Cl.
CPC ................................. *H04N 9/317* (2013.01)

(58) Field of Classification Search
CPC ........ H04N 9/317; H04N 9/31; H04N 9/3135; H04N 9/3152; H04N 9/3185; H04N 9/28; H04N 9/3188
USPC ........ 348/739, 744–747, 806, 807; 382/154; 345/8, 428, 419, 156, 633, 589
See application file for complete search history.

(56) References Cited

U.S. PATENT DOCUMENTS

| 12,003 | A | 11/1854 | Shirley |
| 2,482,115 | A | 9/1949 | Laird, Jr. |
| 2,731,883 | A | 1/1956 | Kohler et al. |

(Continued)

FOREIGN PATENT DOCUMENTS

| CN | 103080832 | 5/2013 |
| CN | 105005174 | 10/2015 |

(Continued)

OTHER PUBLICATIONS

U.S. International Searching Authority; International Search Report and Written Opinion; dated Feb. 3, 2020, pp. 1-31.

(Continued)

*Primary Examiner* — Sherrie Hsia
(74) *Attorney, Agent, or Firm* — Sheridan Ross P.C.

(57) ABSTRACT

An apparatus and method for optically remapping projected pixels to maximize the utilization and to optimize the distribution of remapped projection pixels to achieve optimal visual performance (generally uniform resolution and luminance). A device interposed between a projector and an imaging surface for optically remapping projected pixel locations with minimal aberration. When this device is interposed between a projector and an imaging surface, it changes the terminal location of each focused pixel such that it maximally coincides with the imaging surface, which is often a surface of complex curvature and very different from the native focal surface of the projector. One implementation of the technology includes a device that uses multiple optical surfaces.

58 Claims, 9 Drawing Sheets

Collimated Display with a Remapping Apparatus (as Viewed from Above)

(56) References Cited

U.S. PATENT DOCUMENTS

| | | | |
|---|---|---|---|
| 4,129,365 A | 12/1978 | Aversano et al. | |
| 4,234,891 A | 11/1980 | Beck et al. | |
| 4,275,962 A * | 6/1981 | Midorikawa | G02B 3/0062 355/1 |
| 4,773,748 A | 9/1988 | Shih et al. | |
| 4,964,718 A | 10/1990 | Van Hoogstrate et al. | |
| 4,971,436 A | 11/1990 | Aoki et al. | |
| 5,762,413 A | 6/1998 | Colucci et al. | |
| 6,042,238 A | 3/2000 | Blackham et al. | |
| 6,231,189 B1 | 5/2001 | Colucci et al. | |
| 6,530,667 B1 | 3/2003 | Idaszak et al. | |
| 6,590,606 B1 | 7/2003 | Hiller et al. | |
| 6,610,974 B1 | 8/2003 | Hunt et al. | |
| 6,631,842 B1 | 10/2003 | Tsikos et al. | |
| 6,848,792 B1 | 2/2005 | De Meerleer | |
| 7,009,782 B2 | 3/2006 | Sekiyama | |
| 7,012,669 B2 | 3/2006 | Streid et al. | |
| 1,103,700 A1 | 10/2007 | Colpaert et al. | |
| 7,347,567 B2 | 3/2008 | Deter et al. | |
| 7,535,648 B2 | 5/2009 | Yoshikawa et al. | |
| 7,647,567 B1 | 1/2010 | Esposito et al. | |
| 7,755,842 B2 | 7/2010 | Rutzen | |
| 7,766,483 B2 | 8/2010 | Balu et al. | |
| 8,194,193 B2 | 6/2012 | Streid et al. | |
| 8,587,497 B2 | 11/2013 | Streid et al. | |
| 9,110,358 B1 | 8/2015 | Vorst et al. | |
| 9,188,850 B2 | 11/2015 | Turner et al. | |
| 9,229,300 B2 | 1/2016 | Hellin et al. | |
| 9,436,068 B2 | 9/2016 | Hauquitz et al. | |
| 9,788,388 B2 | 10/2017 | Ooghe et al. | |
| 9,933,697 B2 | 4/2018 | Lambot | |
| 2003/0147057 A1 | 8/2003 | Idaszak et al. | |
| 2003/0194683 A1 | 10/2003 | Vorst | |
| 2004/0141157 A1 | 7/2004 | Ramachandran et al. | |
| 2004/0212582 A1 | 10/2004 | Thielemans et al. | |
| 2005/0030267 A1 | 2/2005 | Tanghe et al. | |
| 2005/0099608 A1 | 5/2005 | Matthys et al. | |
| 2005/0117121 A1 | 6/2005 | De Meerleer | |
| 2005/0134525 A1 | 6/2005 | Tanghe et al. | |
| 2005/0157275 A1 | 7/2005 | Colpaert et al. | |
| 2005/0185143 A1 | 8/2005 | Bossche et al. | |
| 2005/0185145 A1 | 8/2005 | Halsberghe et al. | |
| 2006/0132403 A1 | 6/2006 | Maximus et al. | |
| 2006/0132910 A1 | 6/2006 | Defever et al. | |
| 2006/0227416 A1 | 10/2006 | Balu et al. | |
| 2007/0120763 A1 | 5/2007 | De Paepe et al. | |
| 2007/0126657 A1 | 6/2007 | Kimpe | |
| 2007/0165162 A1 | 7/2007 | Meersman et al. | |
| 2007/0229394 A1 | 10/2007 | Ishikawa et al. | |
| 2008/0123062 A1 | 5/2008 | Morikuni | |
| 2008/0186415 A1 | 8/2008 | Boud et al. | |
| 2008/0284988 A1 | 11/2008 | Kobayashi et al. | |
| 2009/0040133 A1 | 2/2009 | Clodfelter | |
| 2009/0066919 A1 | 3/2009 | Fujita et al. | |
| 2009/0102915 A1 | 4/2009 | Arsenich | |
| 2009/0153808 A1 | 6/2009 | Benitez et al. | |
| 2009/0266958 A1 | 10/2009 | Meersman et al. | |
| 2010/0182769 A1 | 7/2010 | Meersman | |
| 2010/0202047 A1 | 8/2010 | Maximus et al. | |
| 2010/0277816 A1 | 11/2010 | Kweon et al. | |
| 2011/0242074 A1 | 10/2011 | Bert et al. | |
| 2013/0070339 A1 | 3/2013 | Pretorius | |
| 2013/0120720 A1 | 5/2013 | Hellin et al. | |
| 2014/0118818 A1 | 5/2014 | Nishina et al. | |
| 2014/0354957 A1 | 12/2014 | Vermeirsch | |
| 2015/0049310 A1 | 2/2015 | Vermeirsch | |
| 2015/0138514 A1 | 5/2015 | Tsuchiya et al. | |
| 2015/0219500 A1 | 8/2015 | Maes | |
| 2016/0104460 A1 | 4/2016 | Kiichle-Gross et al. | |
| 2016/0253935 A1 | 9/2016 | Gerets et al. | |
| 2016/0299417 A1 | 10/2016 | Lambot | |
| 2016/0357094 A1 | 12/2016 | Ishii | |
| 2017/0059971 A1 | 3/2017 | Takano et al. | |
| 2017/0200386 A1 | 7/2017 | Smith et al. | |
| 2017/0235138 A1 | 8/2017 | Morohashi et al. | |
| 2017/0261846 A1 | 9/2017 | Maes et al. | |
| 2017/0262020 A1 | 9/2017 | Patel | |
| 2017/0287112 A1 | 10/2017 | Stafford et al. | |
| 2018/0113663 A1 | 4/2018 | Jain | |
| 2018/0192017 A1 | 7/2018 | Vandemaele et al. | |
| 2019/0025582 A1 | 1/2019 | Morohashi et al. | |
| 2019/0081281 A1 | 3/2019 | Chesterman et al. | |
| 2019/0235369 A1 | 8/2019 | Janssens et al. | |
| 2020/0159104 A1 | 5/2020 | Spiegelman et al. | |

FOREIGN PATENT DOCUMENTS

| | | |
|---|---|---|
| DE | 19809711 | 3/1998 |
| EP | 1414239 | 4/2004 |
| EP | 1434433 | 6/2004 |
| EP | 1450568 | 8/2004 |
| EP | 1471746 | 10/2004 |
| EP | 1473687 | 11/2004 |
| EP | 1505565 | 2/2005 |
| EP | 1513060 | 3/2005 |
| EP | 1536399 | 6/2005 |
| EP | 1548573 | 6/2005 |
| EP | 1558042 | 7/2005 |
| EP | 1569463 | 8/2005 |
| EP | 1569464 | 8/2005 |
| EP | 1613072 | 1/2006 |
| EP | 1687793 | 8/2006 |
| EP | 1808840 | 7/2007 |
| EP | 1952382 | 8/2008 |
| EP | 2159783 | 3/2010 |
| EP | 2597515 | 5/2013 |
| EP | 2837968 | 2/2015 |
| EP | 2897520 | 5/2016 |
| EP | 3024176 | 5/2016 |
| EP | 31343342 | 7/2016 |
| EP | 3343547 | 7/2018 |
| EP | 3454390 | 3/2019 |
| EP | 3599495 | 1/2020 |
| GB | 2486921 | 7/2012 |
| GB | 2496534 | 10/2013 |
| KR | 10-2004-0093437 | 11/2004 |
| KR | 10-2005-0016195 | 2/2005 |
| KR | 10-2005-0025918 | 3/2005 |
| KR | 10-2005-0065396 | 6/2005 |
| KR | 10-2006-0123755 | 12/2006 |
| KR | 101121268 | 3/2012 |
| WO | WO 2005/052902 | 6/2005 |
| WO | WO 2007/059965 | 5/2007 |
| WO | WO 2008/155366 | 12/2008 |
| WO | WO 2009/010500 | 1/2009 |
| WO | WO 2010/023270 | 3/2010 |
| WO | WO 2012/013675 | 2/2012 |
| WO | WO 2012/089849 | 7/2012 |
| WO | WO 2013/104430 | 7/2013 |
| WO | WO 2013/164015 | 11/2013 |
| WO | WO 2014/041464 | 3/2014 |
| WO | WO 2015/063273 | 5/2015 |
| WO | WO 2015/082529 | 6/2015 |
| WO | WO 2015/149877 | 10/2015 |
| WO | WO 2016/061174 | 4/2016 |
| WO | WO 2016/166183 | 10/2016 |
| WO | WO 2017/178519 | 10/2017 |
| WO | WO 2018/011059 | 1/2018 |
| WO | WO 2018/019369 | 2/2018 |
| WO | WO 2018/020035 | 2/2018 |
| WO | WO 2018/122300 | 7/2018 |
| WO | WO 2018/141407 | 8/2018 |
| WO | WO 2019/020725 | 1/2019 |
| WO | WO 20191185949 | 10/2019 |

OTHER PUBLICATIONS

"Constant Resolution Visual System Family of Products," The Boeing Company, Date Unknown, retrieved from https://www.boeing.com/defense/support/training/constant-resolution-visual-system/, 3 pages.

(56) References Cited

OTHER PUBLICATIONS

"The Reality of Virtual Training," The Boeing Company, Aug. 10, 2015, retrieved from https://www.boeing.com/features/2015/08/bds-crvs-08-15.page, 4 pages.

"Who's Afraid of Freeform Optics," Uploaded to YouTube by Zemax LLC, Jan. 18, 2018, retrieved from https://youtu.be/9nb_B7-U16g, 2 pages.

Brix et al., "Designing Illumination Lenses and Mirrors by the Numerical Solution of Monge-Ampere Equations," arXiv, No. 1506.07670v2, dated Dec. 5, 2015, 16 pages.

Cayrel, "E-ELT Optomechanics: Overview," Proc. SPIE 8444, Ground-based and Airborne Telescopes IV, 84441X, Sep. 17, 2012, 18 pages.

Sieler et al., "Microoptical array projectors for free-form screen applications," Optics Express, vol. 21, No. 23, Nov. 18, 2013, 9 pages.

Vorst et al., "Constant Resolution: A Disruptive Technology for Simulator Visual System Design," Interservice/Industry Training, Simulation, and Education Conference (I/ITSEC), Paper No. 12030, 2012, 6 pages.

International Search Report and Written Opinion for International (PCT) Patent Application No. PCT/US2019/ 42485, dated Feb. 7, 2020, 12 pages.

Official Action for U.S. Appl. No. 16/689,866, dated Mar. 6, 2020, 12 pages.

Notice of Allowance for U.S. Appl. No. 16/689,866, dated Feb. 1, 2021, 8 pages.

Official Action for U.S. Appl. No. 16/689,866, dated Jul. 29, 2020, 12 pages.

* cited by examiner

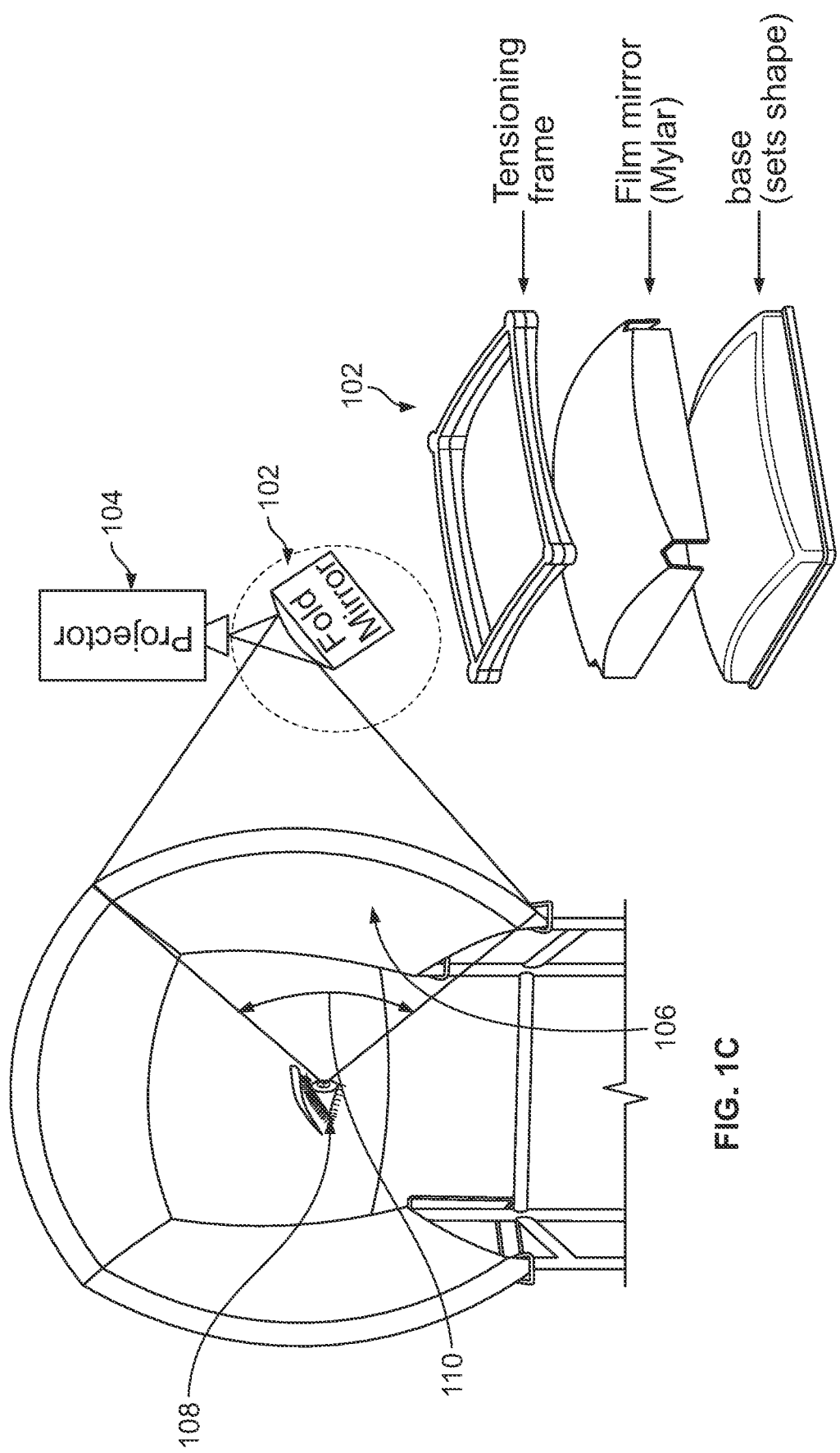

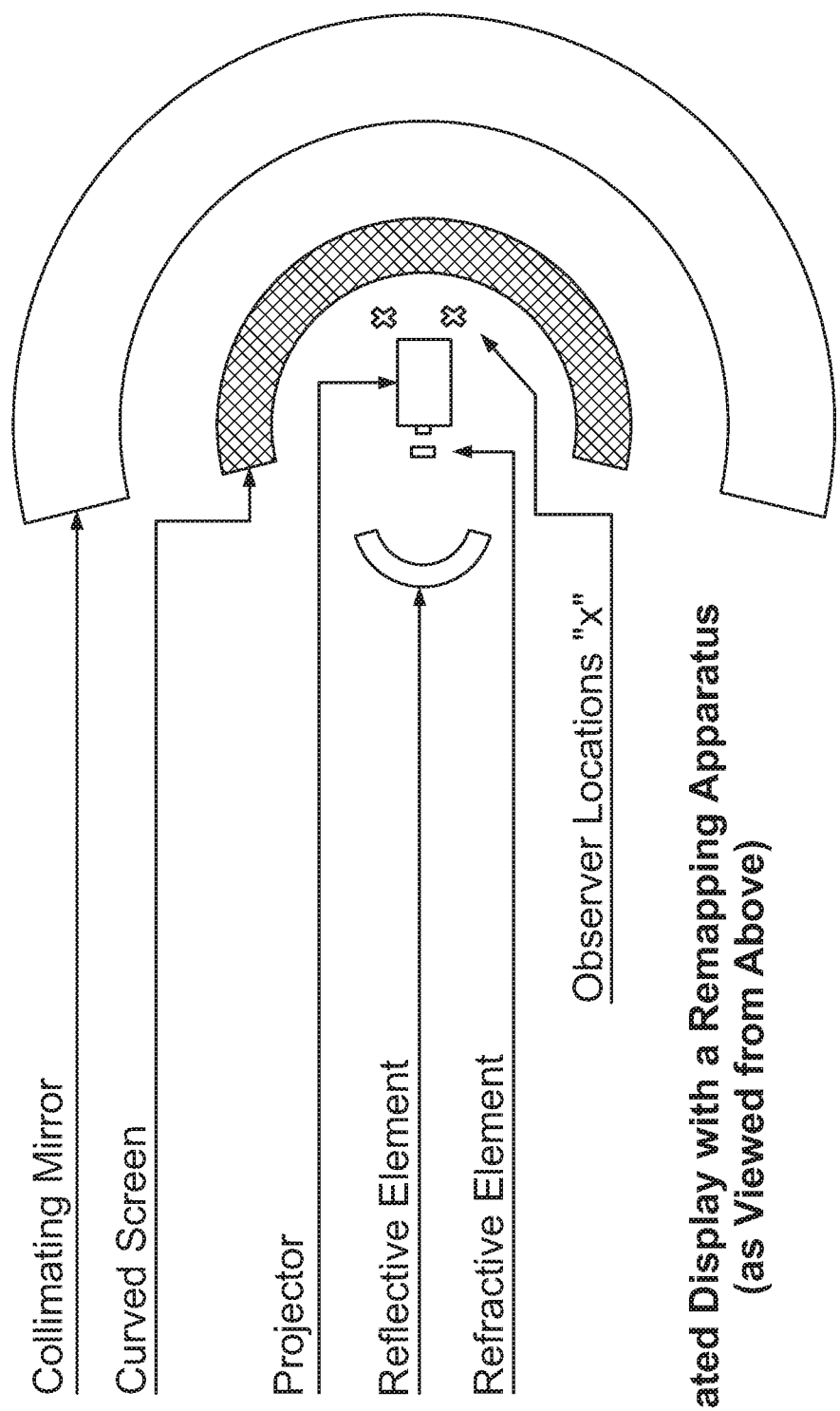

Collimated Display with a Remapping Apparatus (as Viewed from Above)

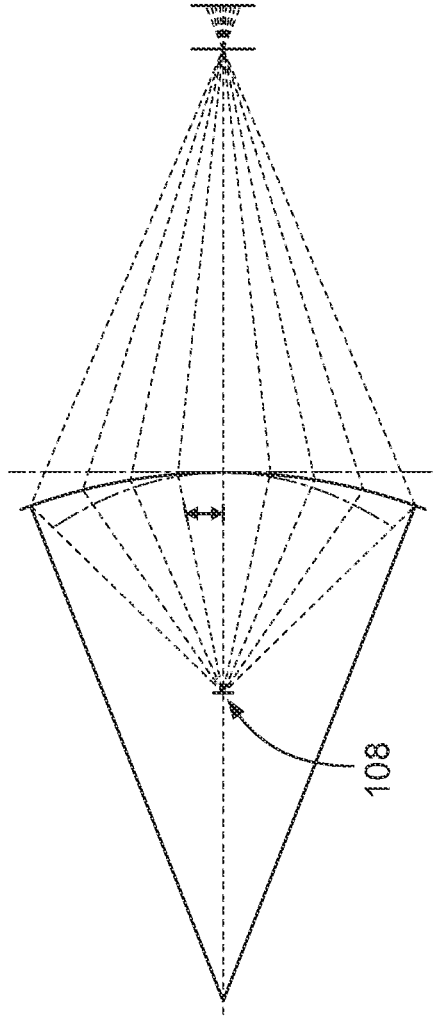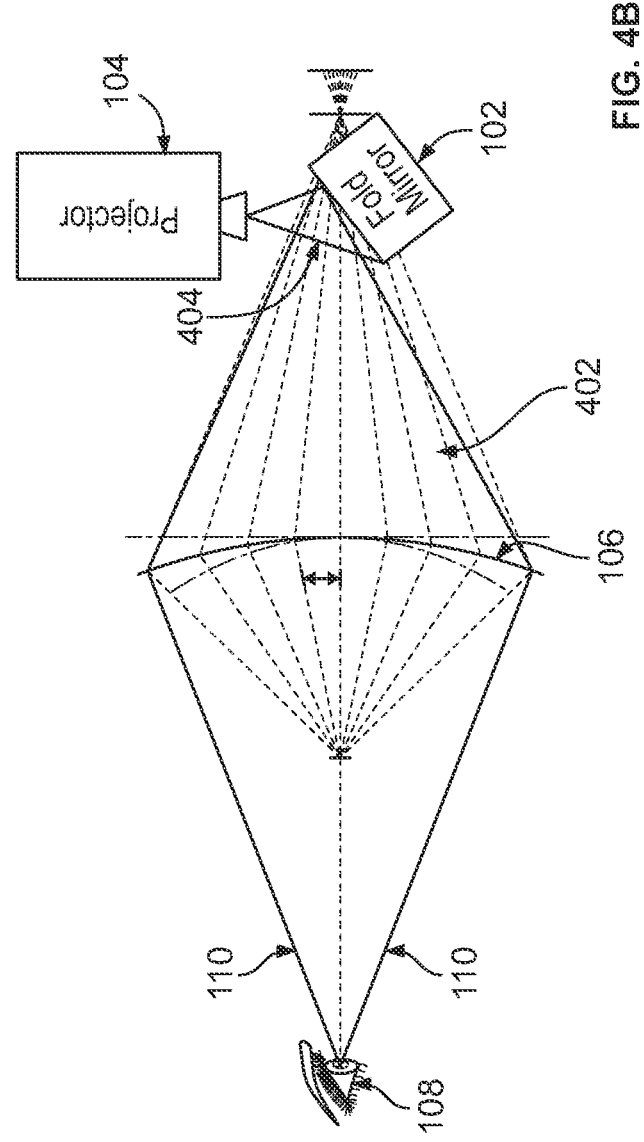

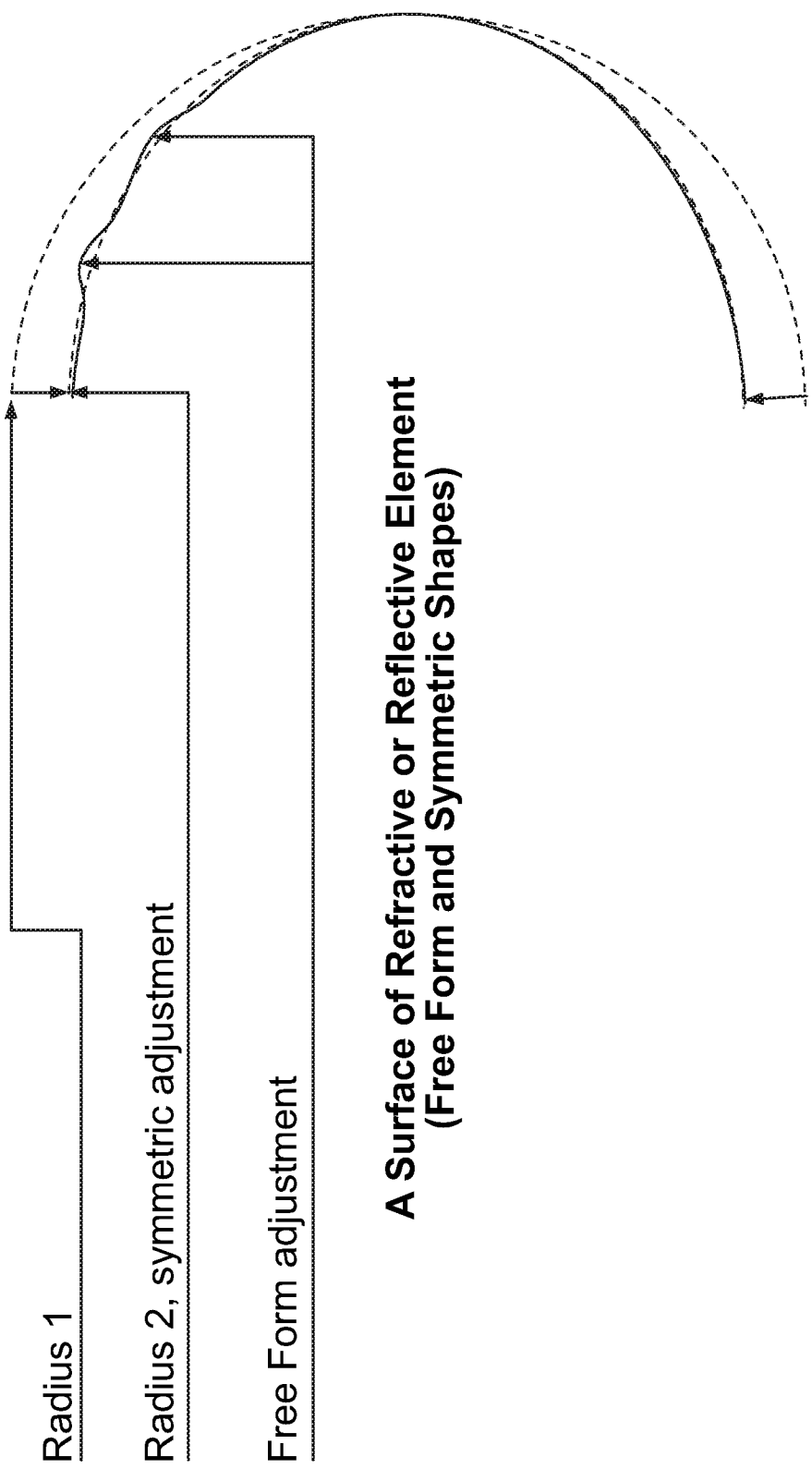

METHOD AND APPARATUS FOR REMAPPING PIXEL LOCATIONS

CROSS REFERENCE

This application claims the benefit of and priority to U.S. Provisional Patent Application Ser. No. 62/769,368, filed Nov. 19, 2018 and entitled DEVICE FOR OPTICALLY REMAPPING PROJECTED PIXEL LOCATIONS WITH MINIMAL ABERRATION, which is hereby incorporated herein in its entirety.

BACKGROUND

Field

This technology as disclosed herein relates generally to optical remapping of projected pixel locations and, more particularly, to remapping with minimal aberration.

Background

The cost and performance efficiency of a projector-based visual display system is primarily dependent upon the utilization of available projector pixels. Commercially available projectors are designed to provide a rectangular projection frustum, with square pixels, and negligible field curvature. A visual display system is generally designed to achieve a required Field Of View (FOV), resolution, and luminance. Since the most efficient distribution of pixels for human observation is that of a visual sphere, and a rectangle does not tessellate onto a sphere with high efficiency, these visual requirements generally result in poor utilization of the rectangular, square-pixel, projection frustum.

There are special lens systems, namely fish-eye ("f-theta") and anamorphic lenses which enable some adjustment of the rectangular projection frustum, but they are inadequate. Fish-eye lenses have limited tolerance for the location of the origin of projected light, which can force the projector to be located within the viewing area or other physical obstruction. Further, Fish-eye lenses also have less tolerance for tuning the local distribution of pixels. An afocal anamorphotic cylindrical lens system which is set up in the projection path of rays of a spherical projection and camera objective lens on the side of the longer distance between back lens and image and serves for obtaining an image sharp in all image points. Anamorphosing cylindrical lens systems have become known which consist of a lens component positioned in front of the objective having a positive cylindrical power of refraction, and another lens component, separated from the first by air and having a negative cylindrical power of refraction the cylinder axes of these members being parallel to each other with each of said two components formed of a converging lens cemented to a diverging lens and with the cylindrical cemented surface in the diverging component having a converging effect and with its concave surface turned toward the converging component, and the cemented surface of the converging component having a diverging effect and with its converging surface turned toward the diverging component. Axes of the two components lie in vertical planes so that the system in the horizontal plane decreases the focal length of the objective while in the vertical plane the focal length remains unchanged, i.e. in the horizontal plane a change of the image scale is affected while in the vertical plane the image scale remains unchanged. However, anamorphic lenses are also relatively intolerant of the tuning of the local distribution of pixels. Commercially available anamorphic lenses are also limited to small changes in aspect ratio.

Another objective having become known up to now consists of at least five lenses the diverging components being made up of three lenses. In spite of the number of lenses and the arrangement of these known systems the projection quality, especially in respect to coma and distortion, is not satisfactory.

A better apparatus and/or method is needed for improving optical remapping of projected pixel locations and, more particularly, to remapping with minimal aberration.

SUMMARY

The technology as disclosed herein includes a method and apparatus for optically remapping projected pixels to maximize the utilization and to optimize the distribution of remapped projection pixels to achieve optimal visual performance (generally uniform resolution and luminance). By way of illustration, fish-eye lenses are utilized in an attempt to meet this need, but Fish-eye lenses have less tolerance for tuning the local distribution of pixels, whereas a slightly flexible mirror element (thin glass, e.g.) as proposed herein for the present technology and its various embodiments and implementation allows for such adjustment without remanufacture of the optical element.

One implementation of the technology is a device interposed between a projector and an imaging surface for optically remapping projected pixel locations with minimal aberration. When this device is interposed between a projector and an imaging surface, it changes the terminal location of each focused pixel such that it maximally coincides with the imaging surface, which is often a surface of complex curvature and very different from the native focal surface of the projector. One implementation of the technology includes a device that uses multiple optical surfaces. However, one implementation of technology includes a single optical surface that is effective when the remapping-induced aberrations (focus blur) are less than the required resolution for the visual display system. Yet another implementation of the technology includes a device that uses a combination of reflective and refractive optical surfaces, however, visual display system performance is improved by a purely reflective or refractive set of optical surfaces. For one implementation of the invention one optical element is utilized to bend the light and the other is used to correct the focus.

One implementation of the technology includes a projector that provides a projected light frustum incident onto a largely cylindrical refractive lens. The center of curvature of this lens is proximately coincident with the light origin point of the projector. This element enables correction of anisotropic focus, which is a product of the degree of angular deviation effected by downstream elements in order to achieve the remapping. It does so because the chief ray (central ray) from the light origin is largely normal to the refracting optical surface and so experiences minimal deviation, but the marginal rays (from edges of the defocused spot at light origin) experience significant deviation, which changes the focal depth—but not the location—of a given pixel. For one implementation of the technology as disclosed and claimed herein this lens uses multiple elements to reduce chromatic dispersion (achromatic doublet, e.g.). Light exiting the aforementioned lens is then incident upon one or more reflective optical surfaces which remap the projected pixel locations by way of non-planar surface geometry.

For one implementation of the technology as disclosed and claimed herein a single reflective surface is used, and the reflective surface is provided by a first-surface-coated thin glass substrate (for one implementation about approximately 200 micron thickness, e.g.). This thin mirror is forced into a nearly-cylindrical hyperbolic paraboloid. The thin glass mirror provides significant anisotropic magnification producing an elongated aspect ratio when the pixels are finally incident upon the imaging surface. It also generates significant field curvature in the same axis. In "cross-cockpit collimated" visual display systems as well as "dome" visual display systems it is common to employ a spherical, toroidal or other quadric imaging surface, which is much wider than it is tall. The aforementioned thin glass mirror adjusts the pixel locations and focal surface to more optimally converge on said imaging surface. This enables a single higher-resolution projector, to replace two or more lower-resolution projectors. The thin mirror material can be constructed of any material that can be polished to the required optical smoothness and/or on which a reflective coating is applied. The mirror has a reflective coating or a reflective portion, and has another portion that holds the structure itself (the substrate). For one implementation the substrate is constructed of one or more of, glass, plastic, metal, metal composite, acrylic, ceramic and carbon fiber. One implementation of a reflective coating includes one or more of aluminum, silver or a comparable material on glass. The reflective coating can be applied to a plastic film, rigid plastic or acrylic. Various manufacturing processes for the substrate and the reflective coating can be used without departing from the scope of the invention, The surface geometry of the thin glass mirror—by way of mechanical pressure—can be tuned to achieve a free-form optical shape, which more optimally distributes pixels per visual display system requirements. This enables accommodation for deviations from nominal in the surface geometry of the screen, or deviations in the mapping of the FOV angles onto the imaging surface. For one implementation of the technology, a proprietary software analysis package (MATLAB code & GUI) is utilized, which enables the empirical (human-in-the-loop) determination of free-form and aspheric geometries to optimally remap pixels via the mechanical tuning of the mirror.

Visual display systems for regulatory-certified aviation simulation training use multiple projectors with overlapping images to provide certifiable visual performance. The technology as disclosed and claimed herein provides the ability to replace these projectors with a single projector. This dramatically reduces the cost and complexity of maintaining the 'alignment' (the color, luminance, gamma, and geometric performance) of adjacent channels, and eliminates the need for costly, error-prone 'blending' of adjacent channels. Poor utilization of projector pixels costs the Audio-Visual (A/V) and Visual Simulation (VizSim) markets millions of dollars annually. If pixels can be optically remapped, fewer projectors are required, and there is less need for multi-projector alignment systems. Luminance, dynamic range, and system are all increased.

For one implementation of the technology, a visual system design tool is utilized, which could then be modified to simulate the lens behavior for the proposed system. For the technology as disclosed and claimed herein, the technology as disclosed herein provides for a more advanced control of pixel location via the mirror shape, and produces curvilinear and local pixel redistribution rather than just an angularly uniform stretch. In particular, visual display system applications generally need a combination of anamorph and local pixel redistribution. Were a Fisheye Lens used, significant pixels would be lost. For one implementation of the technology, solutions can be tuned for various imaging surface geometries. Focus aberrations become quickly apparent as degree of remapping increases. The technology as disclosed and claimed herein seeks to address the focus issue. One implementation of the technology as disclosed and claimed is a device to remap projector pixels with substantially maximal pixel utilization and substantially optimal resolution for an observer or observers of a display system. The device is interposed within the optical path between image formation within a projector and later image formation upon a curved screen. The device includes at least a refractive element and a reflective element which are positioned in optical subsequency. The focal surfaces of the refractive and reflective elements each have a longest dimension, and said focal surface longest dimensions are oriented substantially orthogonal to one another. For one implementation, the device first uses refraction to substantially astigmatize the projected image's focus to a degree, which is substantially inverse to the focal astigmatism introduced by optically subsequent elements. For one implementation, the device next uses reflection to supplementarily optically redirect light, a.k.a. remap pixels, from a projector to substantially optimal locations on a curved screen. The device is adjustable in its optical effect in order to support any of the following: various projectors, various projector configurations, various display systems, various display system configurations, variations in display system components, variation in observer location variation in required field of view and/or resolution. Fewer projectors are required, and less need for multi-projector alignment systems. Luminance, dynamic range, and system MTBF are all increased. A device can be tunable if needed. The thin mirror configuration having thin glass minimizes chromatic aberration and enables large magnification/large remapping. The features, functions, and advantages that have been discussed can be achieved independently in various implementations or may be combined in yet other implementations further details of which can be seen with reference to the following description and drawings.

The technology as disclosed and claimed herein is particularly applicable for applications for larger remapping with higher pixel densities. Higher pixel densities requiring larger remappings have necessitated a newer solution and is one of the reasons for the present technology as described. Further, the present technology provides for correcting resolution from a DEP. The prior art does not do large remapping of high pixel densities to a remapped location that would be optimal from a DEP with uniform resolution across the field of view. Further the present technology is tunable into a freeform which is not taught by the prior art. By way of illustration, for collimated systems, one implementation of the technology provides an eye point for at least two observers so the technology as disclosed and claimed optimizes the system for the best balance between multiple observers so when the term design eye position (DEP) is utilized herein, for one implementation, it is a DEP that is a balance between the eye positions of multiple observers. The DEP in this case represents the position of many observers, therefore when the term observer is utilized herein it can refer to multiple observers. The adjustment parameters of the system can be adjusted with respect to an observer's position or observers' positions. These and other advantageous features of the present technology as disclosed will be in part apparent and in part pointed out herein below.

BRIEF DESCRIPTION OF THE DRAWINGS

For a better understanding of the present technology as disclosed, reference may be made to the accompanying drawings in which:

FIGS. 1C and 1D are illustrations of a thin mirror interposed between a projector and an imaging surface and the design eye point;

FIGS. 3A through 3C are illustrations of an application in a "cross-cockpit collimated" visual display systems or "dome" visual display system;

FIGS. 4A-4B are illustrations of a set of viewing vectors generated from the DEP to represent the projection of the field of view;

FIG. 5 is a graphical illustration of a freeform;

Figure 1B:
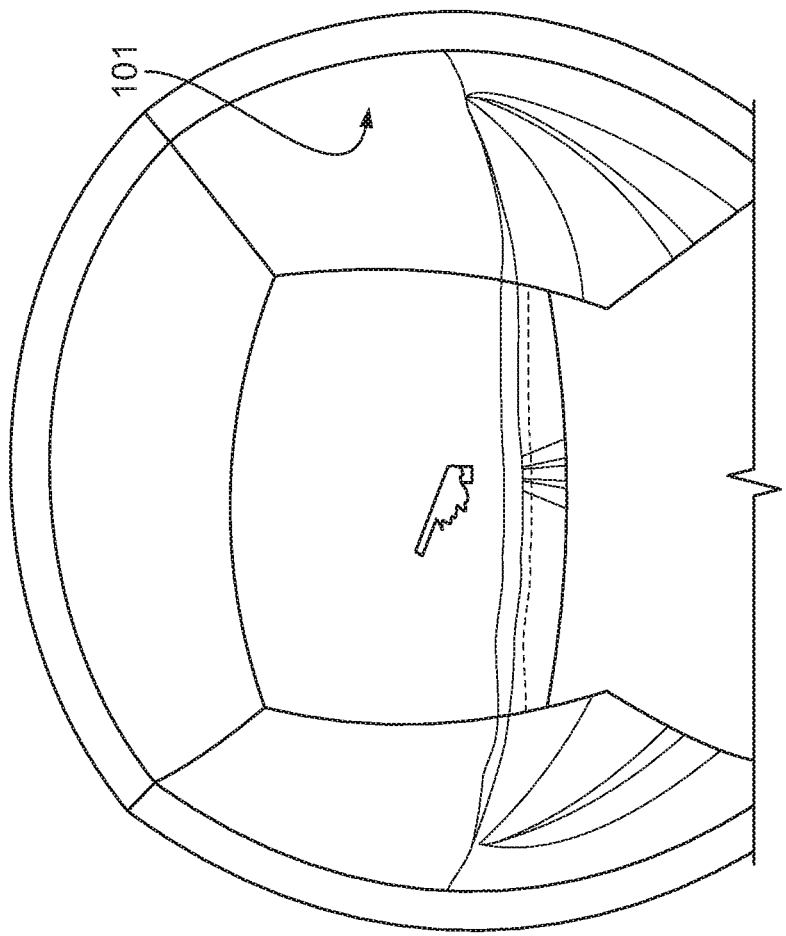
FIGS. 1A and 1B are illustrations of an imaging surface of a simulator.

While the technology as disclosed is susceptible to various modifications and alternative forms, specific implementations thereof are shown by way of example in the drawings and will herein be described in detail. It should be understood, however, that the drawings and detailed description presented herein are not intended to limit the disclosure to the particular implementations as disclosed, but on the contrary, the intention is to cover all modifications, equivalents, and alternatives falling within the scope of the present technology as disclosed and as defined by the appended claims.

DESCRIPTION

According to the implementation(s) of the present technology as disclosed, various views are illustrated in FIGS. 1-6 and like reference numerals are being used consistently throughout to refer to like and corresponding parts of the technology for all of the various views and figures of the drawing. Also, please note that the first digit(s) of the reference number for a given item or part of the technology may correspond to the figure number in which the item or part is first identified. Reference in the specification to "one embodiment" or "an embodiment"; "one implementation" or "an implementation" means that a particular feature, structure, or characteristic described in connection with the embodiment or implementation is included in at least one embodiment or implementation of the invention. The appearances of the phrase "in one embodiment" or "in one implementation" in various places in the specification are not necessarily all referring to the same embodiment or the same implementation, nor are separate or alternative embodiments or implementations mutually exclusive of other embodiments or implementations.

The technology as disclosed and claimed herein is a method and apparatus for optically remapping projected pixels to maximize the utilization and to optimize the distribution of remapped projection pixels to achieve optimal visual performance (generally uniform resolution and luminance). One implementation of the technology is a device interposed between a projector and an imaging surface for optically remapping projected pixel locations with minimal aberration. When this device is interposed between a projector and an imaging surface, it changes the terminal location of each focused pixel such that it maximally coincides with the imaging surface, which is often a surface of complex curvature and very different from the native focal surface of the projector. One implementation of the technology includes a device that uses multiple optical surfaces. However, one implementation of technology includes a single optical surface that is effective when the remapping-induced aberrations (focus blur) are less than the required resolution for the visual display system. Yet another implementation of the technology includes a device that uses a combination of reflective and refractive optical surfaces, however, visual display system performance is improved by a purely reflective or refractive set of optical surfaces. The technology as disclosed and claimed herein is particularly applicable for applications for larger remapping with higher pixel densities. Higher pixel densities requiring larger remappings have necessitated a newer solution and is one of the reasons for the present technology as described. Further, the present technology provides for correcting resolution from a DEP. The prior art does not do large remapping of high pixel densities to a remapped location that would be optimal from a DEP with uniform resolution across the field of view. Further the present technology is tunable into a freeform which is not taught by the prior art.

Figure 1A:
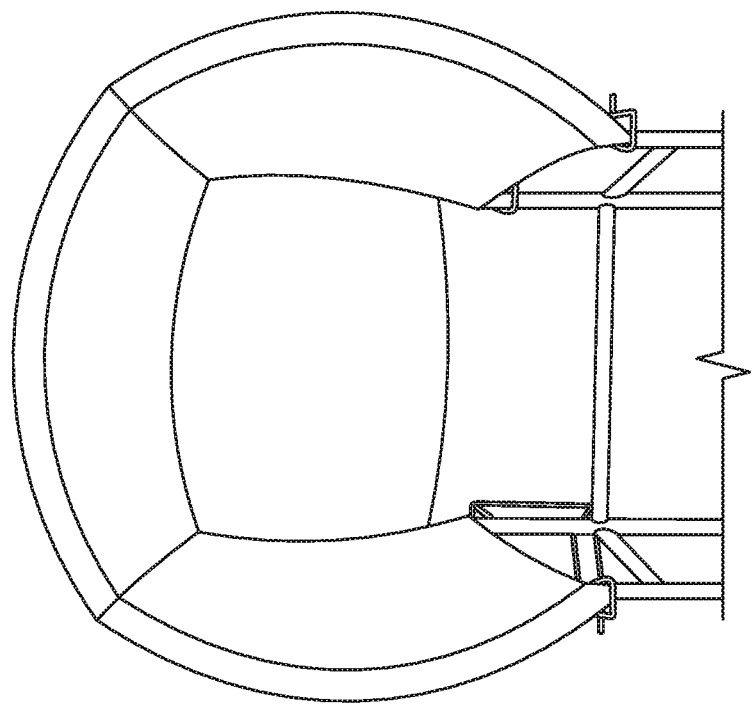

Referring to FIGS. 1A and 1B an illustration of an imaging surface of a simulator is provided. FIG. 1A illustrates the surface on which the image is projected and FIG. 1B illustrates an image being projected on the surface 101. The imaging surface is shown as a surface of complex curvature and very different from the native focal surface of the projector, which teaches an apparatus and method as disclosed and claimed herein for optimizing the distribution of remapped projection pixels to achieve optimal visual performance (generally uniform resolution and luminance). A visual display system such as a flight simulator as illustrated in FIG. 1B is one application of the technology as disclosed and claimed herein.

Referring to FIGS. 1C and 1D, an illustration of a thin mirror 102 interposed between a projector 104 and an imaging surface 106 and the design eye point 108 is illustrated. One implementation for providing a thin film Mylar mirror 102 is illustrated in FIG. 1D, where the thin film Mylar mirror is formed over a base in order to set the shape and a tensioning frame is used to form the shape of the base into the Mylar film.

Figure 2:
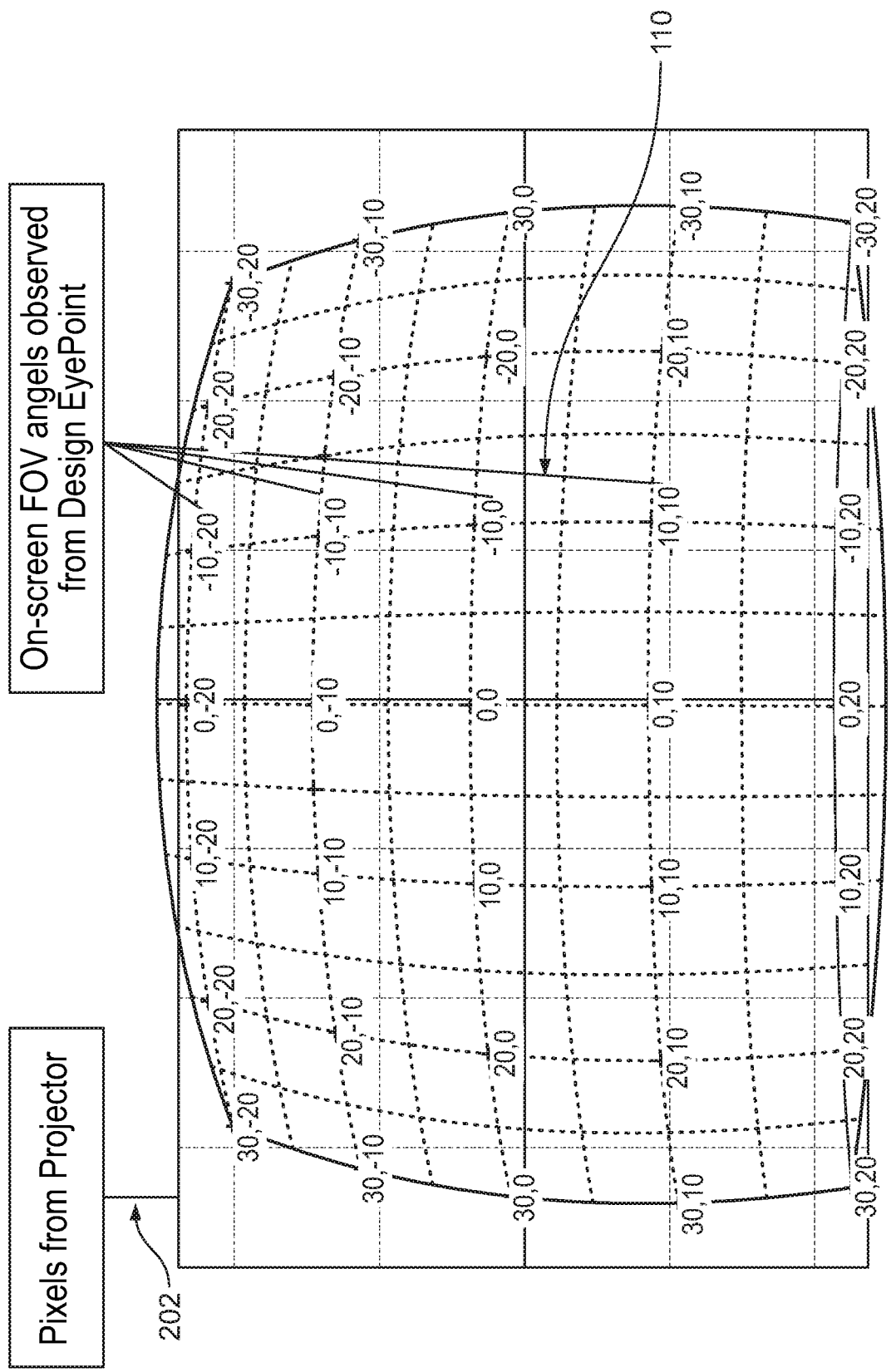
FIG. 2 is an illustration of the mapping of pixels to an imaging surface.
Figure 3A:
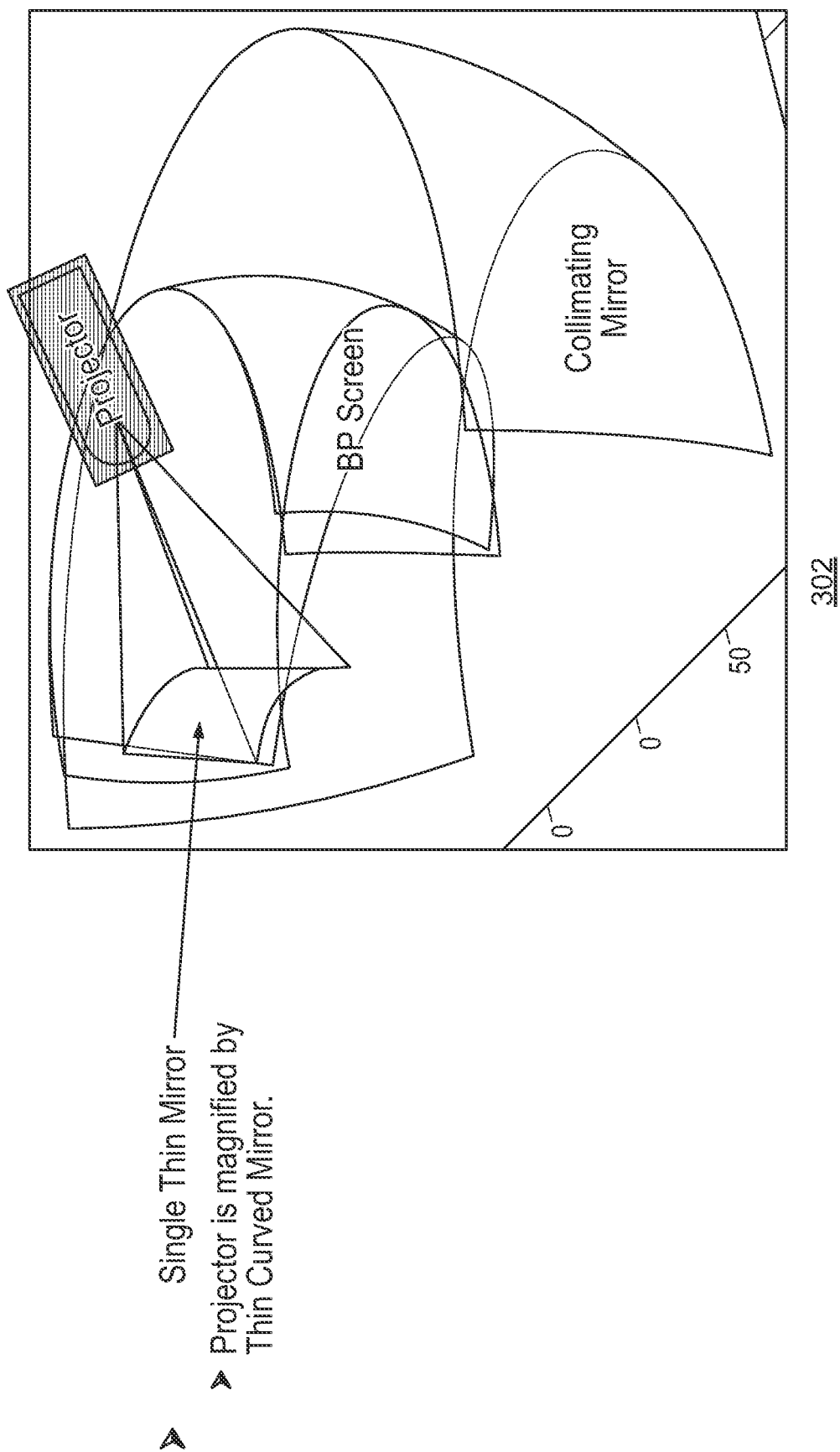
Figure 3C:
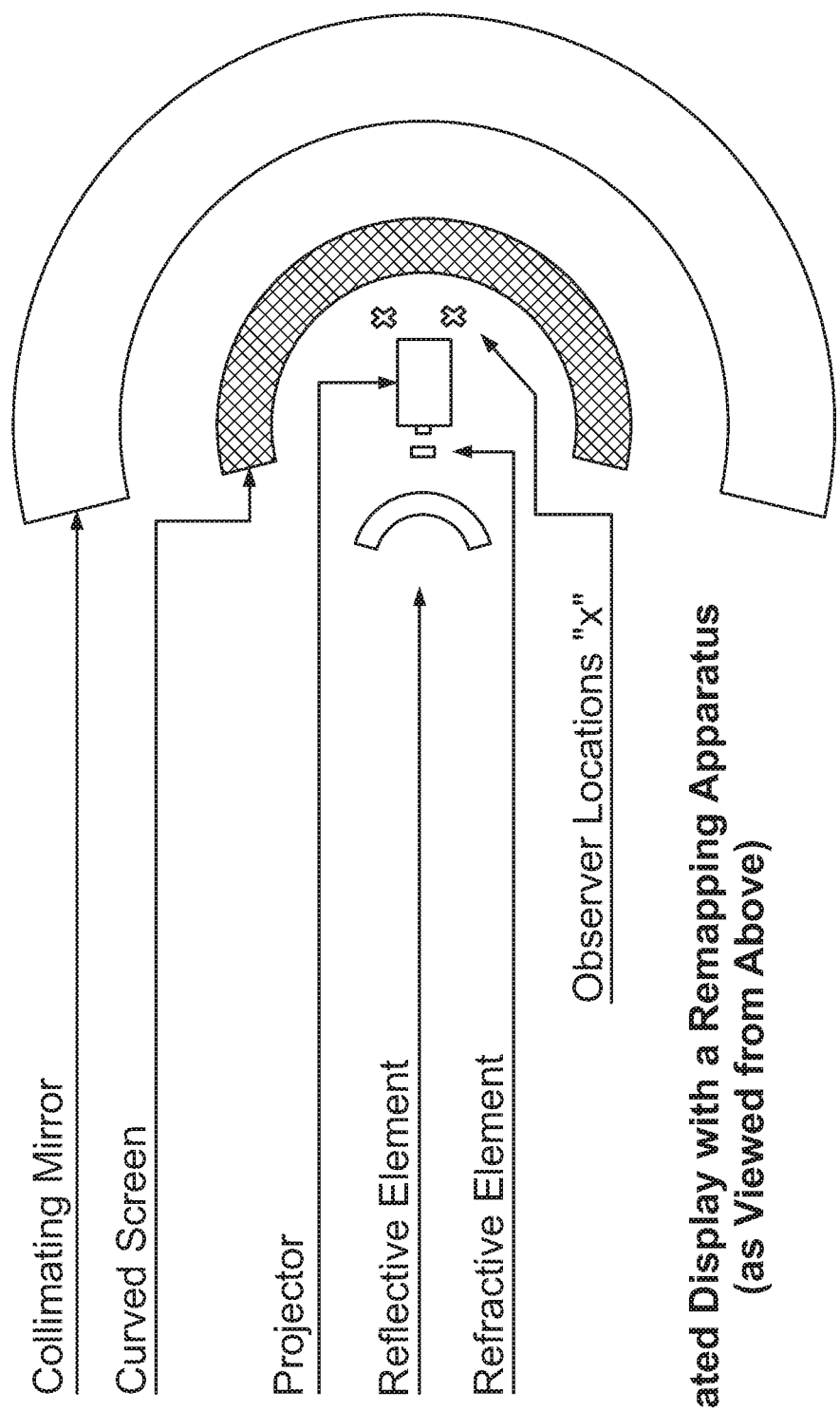

Referring to FIG. 2, an illustration of the mapping of pixels to an imaging surface is illustrated. The on screen field of view observed from the Design Eye Point and pixel mapping are illustrated. Referring to FIGS. 3A-3C, an illustration of an application in a "cross-cockpit collimated" visual display systems or "dome" visual display system. The light leaves the projector, passes through the refractive element, then reflects off of the reflective element, then is incident upon the screen.

Referring to FIG. 4 an illustration of a set of viewing vectors generated from the DEP to represent the projection of the field of view is shown. Referring to FIG. 5 a graphical illustration of a freeform is provided. This type of mirror will be referred to herein as a "free-form" fold mirror. The free-form fold mirror can be shaped to reduce or remove the loss of resolution of image components near the boundaries of the projected light cone. Freeform Optical surfaces are defined as any non-rotationally symmetric surface or a symmetric surface that is rotated about any axis that is not its axis of symmetry. These surfaces can lead to a smaller system size as compared to rotationally symmetric surfaces.

The free-form mirror when illuminated by a point light source produces a given illumination pattern on a target surface that could be flat, spherical or of other shape. For one method of accomplishing the design, the optical ray mapping can be modeled by second order partial differential equations. For another method for accomplishing the design, an approximation of the optical surfaces can be modeled and validated through ray tracing and design of the optical surfaces, particularly the free form mirror can be determined. In addition to the first curved portion, the free-form mirror can include a second curved portion spaced from the first curved portion. In this arrangement, the first flat portion is between the first curved portion and the second curved portion. Additional curved portions can be added as desired or necessary.

One objective Free Form Mirror technology is to equalize the size and spacing of projector pixels to create uniform resolution so the appearance of the image is consistently sharp. Any geometric corrections, such as pre-distorting a square to have a "barrel" shape so that it looks square to the observer instead of having the corners look elongated, will be done by the Image Generator creating the image, and not by the mirror. Prior technologies have not addressed uniform resolution. Another objective of the technology is to provide a fold mirror that creates a uniform pixel density (therefore uniform resolution & more uniform brightness) on any screen surface. The free-form fold mirror 102 described herein would adjust the distribution of the projector's light rays onto the screen 106 to equalize the resolution across the image and produce a much more uniform resolution and brightness. By way of illustration, for one implementation of designing manufacturing and providing for a freeform mirror, a ray trace optimizer that includes a computer based software tool for modeling the ray traces and ultimately the free form shape of the fold mirror is utilized. The freeform mirror could be premanufactured utilizing such a computer based tool. However, for one implementation, the free form mirror is dynamically adjusted with a mechanical push/pull system that mechanically deforms the reflective surface of the mirror to the appropriate curvature. For one implementation, the push/pull mechanism is computer controlled to adjust the curvature of the mirror based on other system parameters in order to reduce aberrations and improve resolution.

The details of the technology as disclosed and various implementations can be better understood by referring to the figures of the drawing. Referring to FIGS. 1-5, one implementation of the present technology as disclosed and claimed comprises a device 102 interposed between a projector 104 and an imaging surface 106 for optically remapping projected pixel locations with minimal aberration, whereby, when this device is interposed between a projector and an imaging surface, it changes the terminal location of each focused pixel (See FIG. 2 for illustration) such that it maximally coincides with the imaging surface, which is often a surface of complex curvature and very different from the native focal surface of the projector, which teaches an apparatus and method as disclosed and claimed herein for optimizing the distribution of remapped projection pixels to achieve optimal visual performance (generally uniform resolution and luminance).

One implementation of the technology as disclosed and claimed herein is a method including determining the display system observer location, a.k.a. Design Eye Point 108, along with the required field of view 110, and required resolution for each portion of field of view. For one implementation the method includes generating a set of viewing vectors 402 generated from the DEP 108 to represent the projection of the field of view 110 onto the image formation surface. The viewing vectors 402 are intersected with a curved screen whereupon the image is formed. For each portion of the field of view, the screen intersection locations determine the location to which projector pixels will be substantially mapped. The required resolution for a given portion of field of view determines the optimal density of pixels within said portion of field of view.

One implementation of the method includes interposing a device 102 within the optical path 404 between image formation within a projector and the later image formation 101 upon a curved screen. For one implementation, the device includes at least a refractive element and a reflective element which are positioned in an optically subsequent order. The focal surfaces of the refractive and reflective elements each have a longest dimension, and said focal surface longest dimensions are oriented substantially orthogonal to one another. For one implementation, the method includes adjusting the adjustable device's optical effect in order to support any of the following: various projectors, various projector configurations, various display systems, various display system configurations, variations in display system components, variation in observer location variation in required field of view and/or resolution. One implementation of the method substantially astigmatizes the projected image's focus by way of refraction and then uses reflection to supplementally optically redirect light from a projector to said screen intersection locations with said optimal pixel density. The method includes optimizing the utilization of the projector's pixels with the device by satisfying the required resolution for the given field of view with a minimum of projector pixels.

One implementation of the technology as disclosed and claimed herein includes a device to remap projector pixels (See item 202 for illustration) with maximal pixel utilization and optimal resolution for an observer or observers of a display system. The device is interposed within the optical path between image formation within a projector and later image formation upon a curved screen. For one implementation of the technology, the device includes at least a refractive element and a reflective element which are positioned in optical subsequency. The focal surfaces of the refractive and reflective elements each have a longest dimension, and said focal surface longest dimensions are oriented substantially orthogonal to one another. The device is configured to use refraction to substantially astigmatize the projected image's focus to a degree which is substantially inverse to the focal astigmatism introduced by optically subsequent elements. For one implementation the device is further configured to use reflection to supplementally optically redirect light, a.k.a. remap pixels, from a projector to optimal locations on a curved screen. For one implementation, the device is configured to be adjustable in its optical effect in order to support any of the following: various projectors, various projector configurations, various display systems, various display system configurations, variations in display system components, variation in observer location variation in required field of view and/or resolution.

For yet another implementation, by way of application when used as a "cross-cockpit collimated" visual display systems or "dome" visual display system, the curved screen is viewed through a collimating mirror (See item 302 for illustration), whereby the required total horizontal field of view exceeds 180 degrees, and the resolution is less than 6.1 arcminutes per optical line pair, and at least the reflective element is adjustable. For on implementation substantially orthogonal is between 70 degrees and 110 degrees.

For the projection system, the image is formed within the projector and projected for being formed on the screen. For one implementation, the projector may include a projection lens. In the case of two or more observers, a compromise design eye position (DEP) is determined uniquely for each portion of the field of view.

For one application of the technology, a curved screen is viewed through a collimating mirror, in which case, the viewing vectors reflect off of the collimating mirror and intersects at the intersection with the curved screen. For one implementation, the curved screen is a section of an ellipsoid or torpid, or minor variation therefrom. Said minor variation does not exceed about approximately 0.25 times the largest curved screen radius of curvature. For one implementation, the curved screen includes one radius of curvature which is approximately infinite.

Pixel density refers to the number of pixels per unit screen area. The projector's resolution may exceed its pixel count by way of pixel shifting. For one implementation, the refractive element is positioned along the optical path, before, after or within the projection lens. For one implementation, planar fold mirrors may be employed throughout the optical path, about or between any optical elements; from image formation within the projector to image observation at the design eye position (DEP).

For one implementation, the refractive elements incorporate multiple sub-elements and multiple refractive optical surfaces. For one implementation, the refractive element has one or more optical surfaces substantially having the shape of a generalized cylinder with a focal surface substantially near, or encompassing, the location of the vertex of the projector's projected light frustum. For one implementation, the refractive element has one or more optical surfaces substantially having the shape of a freeform with a focal surface substantially near, or encompassing, the location of the vertex of the projector's projected light frustum. (freeform defined per ISO standard 17450-1:2011). For one implementation, the refractive element has one or more optical surfaces substantially having a Gaussian curvature of approximately zero with a focal surface substantially near, or encompassing, the location of the vertex of the projector's projected light frustum.

For one implementation, the refractive element is adjustable in its optical effect, such that the refractive element is adjustable to a freeform shape (freeform defined per ISO standard 17450-1:2011). For one implementation, the refractive element adjustment is achieved by mechanical and/or thermal deformation of any of the refractive surfaces. For one implementation, the refractive element adjustment is achieved by adjustment of relative locations of sub-elements. The reflective element is positioned along the optical path, after the refractive element and the projection lens. For one implementation the reflective element may incorporate multiple sub-elements and reflective optical surfaces. For one implementation the reflective element substantially has the shape of a generalized cylinder. For one implementation the reflective element substantially has a freeform shape (freeform defined per ISO standard 17450-1:2011). The reflective element surface substantially has a Gaussian curvature of approximately zero.

For one implementation, the reflective element is adjustable in its optical effect. The reflective element is adjustable to a substantially freeform shape (freeform defined per ISO standard 17450-1:2011). The reflective element adjustment is achieved by mechanical and/or thermal deformation of the reflective surface. For one implementation, the reflective element adjustment is achieved by adjustment of its location relative to the projector, and/or its location relative to the refractive element, and/or the relative locations of the reflective element's sub-elements. The refractive element is close enough to the reflective element that the projected light traverses the refractive element before and after reflection from the reflective element.

The various implementations and examples shown above illustrate a method and system for a software analysis package (MATLAB code & GUI) that is utilized, which enables the empirical (human-in-the-loop) determination of free-form and aspheric geometries to optimally remap pixels via a mechanical tuning of the mirror.

Figure 6:
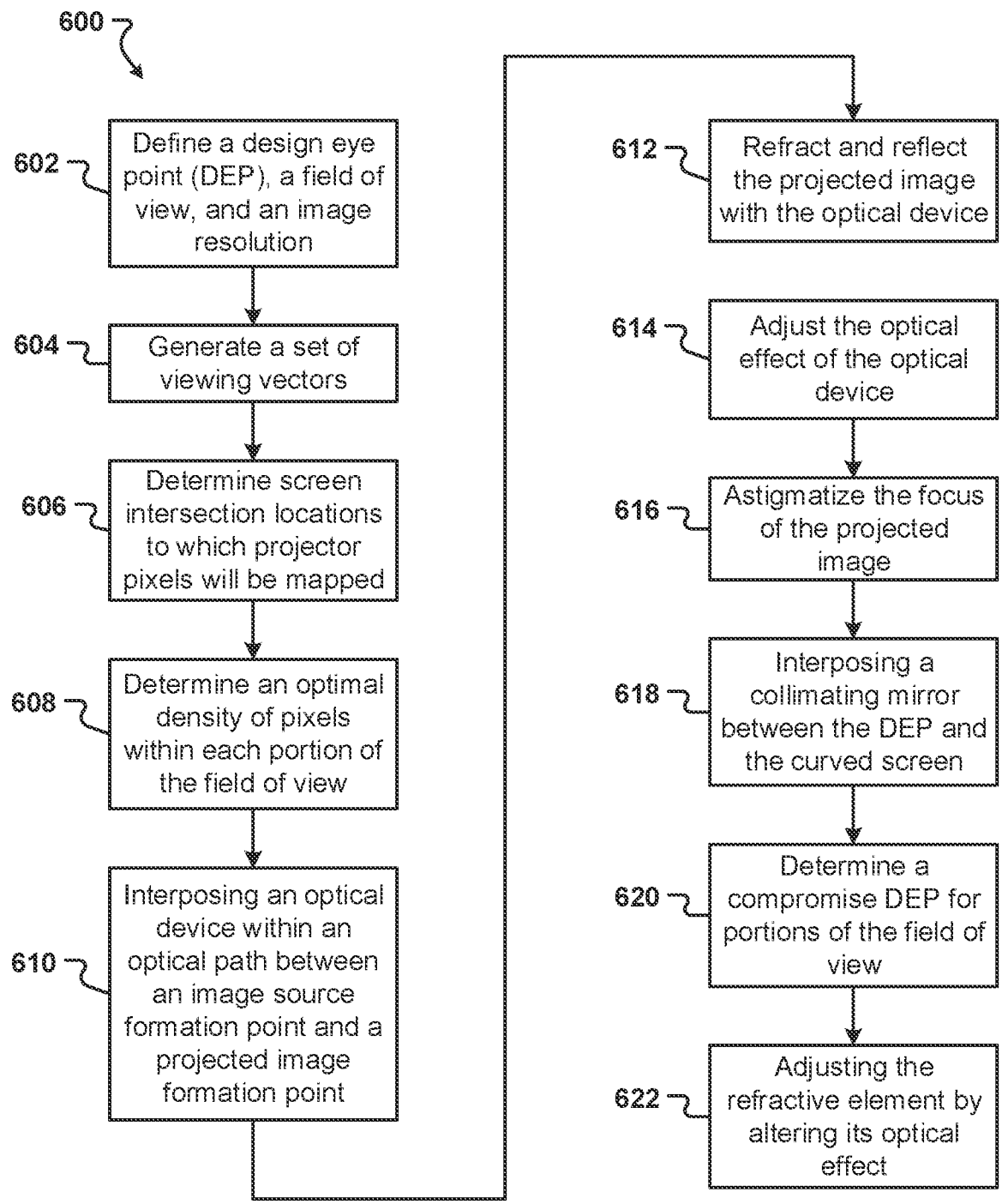
FIG. 6 is a block diagram illustrating a method of the current disclosure.

Referring now to FIG. 6, a block diagram illustrating a method 600 for optically remapping projected pixel locations is generally illustrated. Operation 602 includes defining a design eye point (DEP), a field of view corresponding to the DEP, and an image resolution for a plurality of portions of the field of view when viewing a projected image. In operation 604, a set of viewing vectors from the DEP representative of a projection of the field of view onto an image formation surface are generated. The viewing vectors intersect a curved screen whereupon the projected image will be formed. Operation 606 comprises determining, for each of the plurality of portions of the field of view, screen intersection locations to which projector pixels will be substantially mapped. An optimal density of pixels within each of the plurality of portions of field of view based on the image resolution for a given portion of the field of view is determined in operation 608.

Operation 610 includes interposing an optical device within an optical path between an image source formation point within a projector and a projected image formation point upon the curved screen. The projected image is refracted and reflected with the optical device in operation 612. The optical device may include at least a refractive element and a reflective element positioned in optical subsequence. The focal surfaces of the refractive and reflective elements each have a longest dimension. The longest dimensions of the focal surfaces are oriented substantially orthogonal one with respect to the other.

Operation 614 includes adjusting the optical effect of the optical device in order to support one or more of various projectors, various projector configurations, various display systems, various display system configurations, variations in display system components, variation in observer location, variation in field of view, and variation in image resolution. In one embodiment, adjusting the optical effect of the optical device includes one or more of mechanical deformation and thermal deformation of any of the refractive optical surfaces of the refractive element. Adjusting the optical effect of the optical device may optionally include adjustment of relative locations of sub-elements of the refractive element. Additionally, or alternatively, adjusting the optical effect of the optical device includes one or more of mechanical deformation and thermal deformation of a reflective surface of the reflective element. Operation 614 may also include adjustment of one or more of a location of the reflective element relative to the projector, a location of the reflective element relative to the refractive element; and the relative locations of sub-elements of the reflective element.

The projected image's focus is astigmatized in operation 616 by way of refracting with the refractive element of the optical device and reflecting the astigmatized refracted image with the reflective element of the optical device to supplementally optically redirect light from the astigmatized refracted image to the screen intersection locations with optimal pixel density. In this manner, the optical device optimizes the utilization of the projector's pixels by satisfying the image resolution for the given portion of the field of view with a minimum of projector pixels.

Method 600 may include interposing a collimating mirror between the DEP and the curved screen in operation 618. Accordingly, a viewer at the DEP is viewing the curved screen through the collimating mirror. In one embodiment the method further comprises operation 620 which includes determining a compromise DEP for each of the plurality of portions of the field of view when there are two or more observers.

In one embodiment, method 600 includes adjusting (in operation 622) the refractive element by altering its optical effect. Optionally, the refractive element is adjusted to a freeform shape.

A user of the present method and system may choose any of the above implementations, or an equivalent thereof, depending upon the desired application. In this regard, it is recognized that various forms of the subject software analysis method and system for determination of free-form could be utilized without departing from the scope of the present technology and various implementations as disclosed.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present implementation(s). Accordingly, the specification and drawings are to be regarded in an illustrative rather than a restrictive sense.

Certain systems, apparatus, applications or processes are described herein as including a number of modules. A module may be a unit of distinct functionality that may be presented in software, hardware, or combinations thereof. When the functionality of an analysis module is performed in any part through software, the module includes a computer-readable medium. The analysis modules may be regarded as being communicatively coupled. The inventive subject matter may be represented in a variety of different implementations of which there are many possible permutations.

The methods described herein do not have to be executed in the order described, or in any particular order. Moreover, various activities described with respect to the methods identified herein can be executed in serial or parallel fashion. In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example implementation, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein.

The example computer system and client computers can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and client computing devices can also include an alphanumeric input device (e.g., a keyboard), a cursor control device (e.g., a mouse), a drive unit, a signal generation device (e.g., a speaker) and a network interface device.

The drive unit includes a computer-readable medium on which is stored one or more sets of instructions (e.g., software) embodying any one or more of the methodologies or systems described herein. The software may also reside, completely or at least partially, within the main memory and/or within the processor during execution thereof by the computer system, the main memory and the processor also constituting computer-readable media. The software may further be transmitted or received over a network via the network interface device.

The term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing or encoding a set of instructions for execution by the machine and that cause the machine to perform any one or more of the methodologies of the present implementation. The term "computer-readable medium" shall accordingly be taken to include, but not be limited to, solid-state memories, and optical media, and magnetic media.

The various optical remapping configurations and implementations shown above illustrate remapping projected pixel locations with minimal aberration. A user of the present technology as disclosed may choose any of the above implementations, or an equivalent thereof depending upon the desired application. In this regard, it is recognized that various forms of the subject optical remapping method and apparatus could be utilized without departing from the scope of the present invention.

As is evident from the foregoing description, certain aspects of the present technology as disclosed are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the scope of the present technology as disclosed and claimed.

Other aspects, objects and advantages of the present technology as disclosed can be obtained from a study of the drawings, the disclosure and the appended claims.

What is claimed is:

1. A method for optically remapping projected pixel locations, comprising:
    defining a design eye point (DEP), a field of view corresponding to the DEP, and an image resolution for a plurality of portions of the field of view when viewing a projected image;
    generating a set of viewing vectors from the DEP representative of a projection of the field of view onto an image formation surface, whereby the viewing vectors intersect a curved screen whereupon the projected image will be filmed;
    determining, for each of the plurality of portions of the field of view, screen intersection locations to which projector pixels will be substantially mapped;
    determining an optimal density of pixels within each of the plurality of portions of field of view based on the image resolution for a given portion of the field of view;
    interposing an optical device within an optical path between an image source formation point within a projector and a projected image formation point upon the curved screen, wherein
    the optical device includes at least a refractive element and a reflective element positioned in optical subsequence, where focal surfaces of the refractive and reflective elements each have a longest dimension, and said focal surface longest dimensions are oriented substantially orthogonal one with respect to the other;
    refracting and reflecting the projected image with the optical device;
    adjusting the optical effect of the optical device in order to support one or more of various projectors, various projector configurations, various display systems, various display system configurations, variations in display system components, variation in observer location, variation in field of view, and variation in image resolution; and
    astigmatizing the projected image's focus by way of refracting with the refractive element of the optical device and reflecting the astigmatized refracted image with the reflective element of the optical device to supplementally optically redirect light from the astigmatized refracted image to the screen intersection locations with optimal pixel density, whereby, the optical device thereby optimizes the utilization of the projector's pixels by satisfying the image resolution for the given portion of the field of view with a minimum of projector pixels.

2. The method for optically remapping as recited in claim 1, comprising: interposing a collimating mirror between the DEP and the curved screen whereby a viewer at the DEP is viewing the curved screen through the collimating mirror.

3. The method for optically remapping as recited in claim 2, where the viewing vectors reflect off of the collimating mirror before intersecting the curved screen.

4. The method for optically remapping as recited in claim 1, where a horizontal field of view exceeds 180 degrees, the image resolution is less than 6.1 arcminutes per optical line pair, and one or more of the reflective element and the refractive element is adjustable.

5. The method for optically remapping as recited in claim 1, where substantially orthogonal means between approximately 70 degrees and 110 degrees one with respect to the other.

6. The method for optically remapping as recited in claim 1, where the projector includes a projection lens through which the projector projects the image.

7. The method for optically remapping as recited in claim 6, where the refractive element is positioned along the optical path at one of before, after and within the projection lens.

8. The method for optically remapping as recited in claim 1, further comprising: determining a compromise DEP for each of the plurality of portions of the field of view when there are two or more observers.

9. The method for optically remapping as recited in claim 1, where the curved screen is a section of one of an ellipsoid, a toroid, and a minor variation from the ellipsoid or toroid, where said minor variation does not exceed about approximately 0.25 times a maximum radius of curvature of the curved screen.

10. The method for optically remapping as recited in claim 1, where the curved screen includes a radius of curvature which is approximately infinite.

11. The method for optically remapping as recited in claim 1, where pixel density is the number of pixels per unit screen area and where a resolution of the projector may exceed a pixel count of the projector by way of pixel shifting.

12. The method for optically remapping as recited in claim 1, where one or more planar fold mirrors are employed throughout the optical path, about or between any optical elements, from the image source formation point within the projector to image observation at the DEP.

13. The method for optically remapping as recited in claim 1, where the refractive element incorporates multiple sub-elements and multiple ref alive optical surfaces.

14. The method for optically remapping as recited in claim 13, where the refractive element includes one or more optical surfaces substantially having a shape of a generalized cylinder with a focal surface substantially near, or encompassing; a location of a vertex of a projected light frustum of the projector.

15. The method for optically remapping as recited in claim 13, where the refractive element includes one or more optical surfaces substantially having a shape of a freeform with a focal surface substantially near, or encompassing, a location of a vertex of a projected light frustum of the projector.

16. The method for optically remapping as recited in claim 13, where the refractive element includes one or more optical surfaces substantially having a Gaussian curvature of approximately zero with a focal surface substantially near, or encompassing, a location of a vertex of a projected light frustum of the projector.

17. The method for optically remapping as recited in claim 13, where adjusting the optical effect of the optical device includes one or more of mechanical deformation and thermal deformation of any of the refractive optical surfaces of the refractive element.

18. The method for optically remapping as recited in claim 13, where adjusting the optical effect of the optical device includes adjustment of relative locations of sub-elements of the refractive element.

19. The method for optically remapping as recited in claim 1, where adjusting the optical effect of the optical device includes adjustment of one or more of: a location of the reflective element relative to the projector; a location of the reflective element relative to the refractive element; and the relative locations of sub-elements of the reflective element.

20. The method for optically remapping as recited in claim 1, further comprising: adjusting the refractive element by altering its optical effect.

21. The method for optically remapping as recited in claim 20, where the refractive element is adjusted to a freeform shape.

22. The method for optically remapping as recited in claim 1, where the reflective element is positioned along the optical path, after the refractive element and a projection lens.

23. The method for optically remapping as recited in claim 1, where the reflective element includes one or more of multiple sub-elements and multiple reflective optical surfaces.

24. The method for optically remapping as recited in claim 1, where the reflective element has a shape of a generalized cylinder.

25. The method for optically remapping as recited in claim 1, where the reflective element has a shape of a freeform.

26. The method for optically remapping as recited in claim 1, where the reflective element substantially has a Gaussian curvature of approximately zero.

27. The method for optically remapping as recited in claim 1, where the reflective element is adjustable in its optical effect.

28. The method for optically remapping as recited in claim 1, where the reflective element is adjustable to a substantially freeform shape.

29. The method for optically remapping as recited in claim 1, where adjusting the optical effect of the optical device includes one or more of mechanical deformation and thermal deformation of a reflective surface of the reflective element.

30. The method for optically remapping as recited in claim 1, where the refractive element is sufficiently close to the reflective element that the projected light traverses the refractive element before and after reflection from the reflective element.

31. An apparatus for optically remapping projected pixels for an observer of a display system, comprising:
   a projector and a curved screen oriented and positioned for a design eye point (DEP) and a corresponding field of view and for projection of an image from the projector onto the curved screen;
   an optical device interposed within an optical path between an image source formation point within the projector and a projected image formation point upon the curved screen, where the optical device includes at least a refractive element and a reflective element which are positioned in optical subsequence, and where a focal surface of the refractive element and a focal surface of the reflective element each have a longest dimension, and the longest dimensions are oriented substantially orthogonal to one with respect to the other;
   said refractive element configured to substantially astigmatize the projected image's focus to a degree which is substantially inverse to a focal astigmatism introduced by optically subsequent elements using refraction by the refractive element;
   said reflective element configured to supplementally optically redirect light from the projector to optimal locations on the curved screen thereby optically remapping pixels, wherein the reflective element uses reflection to optically redirect the light; and
   said optical device configured to be adjustable in its optical effect in order to support one or more of various projectors, various projector configurations, various display systems, various display system configurations, variations in display system components, variation in observer location, variation in field of view, and variation in image resolution,
   whereby, achieving substantially maximal pixel utilization and substantially optimal image resolution for one or more observers of the display system.

32. The apparatus for optically remapping as recited in claim 31, where a collimating mirror is positioned between the DEP and the curved screen whereby the curved screen is viewed through the collimating mirror and a set of viewing vectors from the DEP reflect off of the collimating mirror before intersecting the curved screen.

33. The apparatus for optically remapping as recited in claim 31, where the projector and the curved screen are configured with respect to the DEP such that a horizontal held of view exceeds 180 degrees, the image resolution is less than 6.1 arcminutes per optical line pair, and at least the reflective element is adjustable.

34. The apparatus for optically remapping as recited in claim 31, where substantially orthogonal means between 70 degrees and 110 degrees.

35. The apparatus for optically remapping as recited in claim 31, where the projector includes a projection lens.

36. The apparatus for optically remapping as recited in claim 35, where the reflective element is positioned along the optical path after the refractive element and the projection lens.

37. The dcvicc apparatus for optically remapping as recited in claim 31, where the projector and curved screen are oriented and positioned for a compromise DEP for each portion of the field of view when there are two or more observers.

38. The dcvicc apparatus for optically remapping as recited in claim 31, where the curved screen is a section of one of an ellipsoid, a torpid, a minor variation from the ellipsoid, and a minor variation from the torrid, where said minor variation does not exceed 0.25 times a maximum radius of curvature of the curved screen.

39. The apparatus for optically remapping as recited in claim 38, where the curved screen has one radius of curvature which is approximately infinite.

40. The apparatus for optically remapping as recited in claim 35, where the refractive element is positioned along the optical path at one of before, after and within and after the projection lens.

41. The apparatus for optically remapping as recited in claim 31, where planar told mirrors are employed throughout the optical path, about or between any optical elements from the image source formation point within the projector to image observation at DEP.

42. The apparatus for optically remapping as recited in claim 31, where the refractive element includes multiple refractive sub-elements and multiple refractive optical surfaces.

43. The apparatus for optically remapping as recited in claim 42, where the refractive element includes one or more optical surfaces substantially having a shape of a generalized cylinder with a focal surface substantially near, or encompassing, a location of a vertex of a projected light frustum of the projector.

44. The apparatus for optically remapping as recited in claim 42, where the refractive element includes one or more optical surfaces substantially having a shape of a freeform with a focal surface substantially near, or encompassing, a location of a vertex of a projected light frustum of the projector.

45. The apparatus for optically remapping as recited in claim 42, where the refractive element includes one or more optical surfaces substantially having a Gaussian curvature of approximately zero with a focal surface substantially near, or encompassing, a location of a vertex of a projected light frustum of the projector.

46. The apparatus for optically remapping as recited in claim 42, where the optical effect of the optical device is adjustable by adjustment of relative locations of sub-elements of the refractive element.

47. The apparatus for optically remapping as recited in claim 31, where the refractive element is configured to be adjustable in its optical effect.

48. The apparatus for optically remapping as recited in claim 47, where the refractive element is configured to be adjustable to a freeform shape.

49. The apparatus for optically remapping as recited in claim 48, where adjustment of the refractive element is achieved by one or more of mechanical deformation and thermal deformation of a refractive optical surfaces of the refractive element.

50. The apparatus for optically remapping as recited in claim 31, where the reflective element includes one or more of multiple reflective sub-elements and multiple reflective optical surfaces.

51. The apparatus for optically remapping as recited in claim 31, where the reflective element has a shape of a generalized cylinder.

52. The apparatus for optically remapping as recited in claim 31, where the reflective element has a shape of a freeform.

53. The apparatus for optically remapping as recited in claim 31, where the reflective element has an optical surface with a Gaussian curvature of approximately zero.

54. The apparatus for optically remapping as recited in claim 31, where reflective element is adjustable in its optical effect.

55. The apparatus for optically remapping as recited in claim 54, where the reflective element may be is adjustable to a substantially freeform shape.

56. The apparatus for optically remapping as recited in claim 54, where adjustment of the reflective element is achieved by one or more of mechanical deformation and thermal deformation of a reflective surface of the reflective element.

57. The apparatus for optically remapping as recited in claim 54, where adjustment of the reflective element is achieved by adjustment of one or more of: its location relative to the projector; its location relative to the refractive element; and relative locations of reflective sub-element of the reflective element.

58. The apparatus for optically remapping as recited in claim 31, where the refractive element is positioned sufficiently close to the reflective element such that light projected by the projector traverses the refractive element before and after reflection from the reflective element.

* * * * *